Oct. 27, 1970 L. H. SMITH, JR 3,536,414
VANES FOR TURNING FLUID FLOW IN AN ANNULAR DUCT
Filed March 6, 1968 3 Sheets-Sheet 1
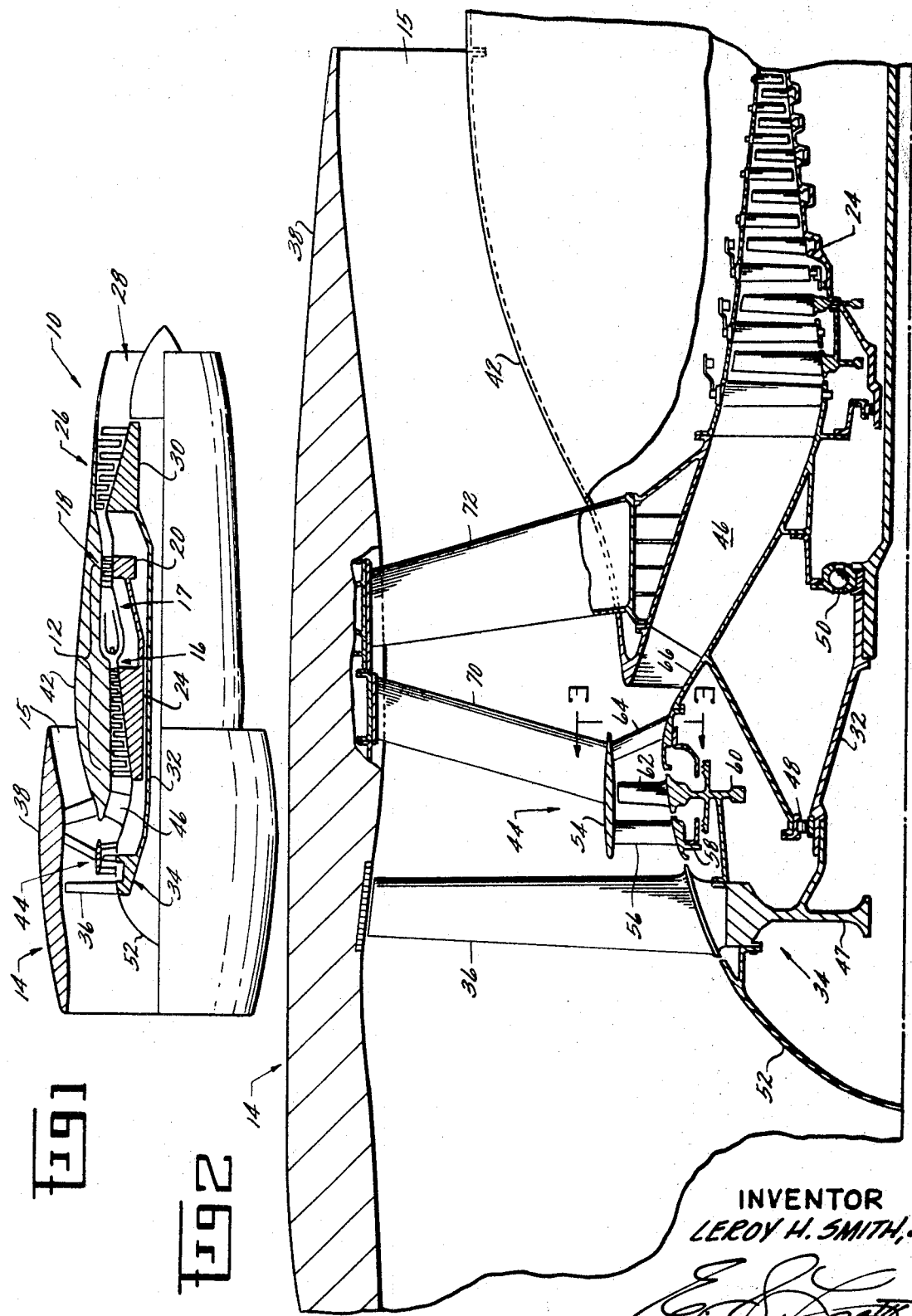
INVENTOR
LEROY H. SMITH, JR
ATTORNEY Oct. 27, 1970     L. H. SMITH, JR     3,536,414
VANES FOR TURNING FLUID FLOW IN AN ANNULAR DUCT
Filed March 6, 1968
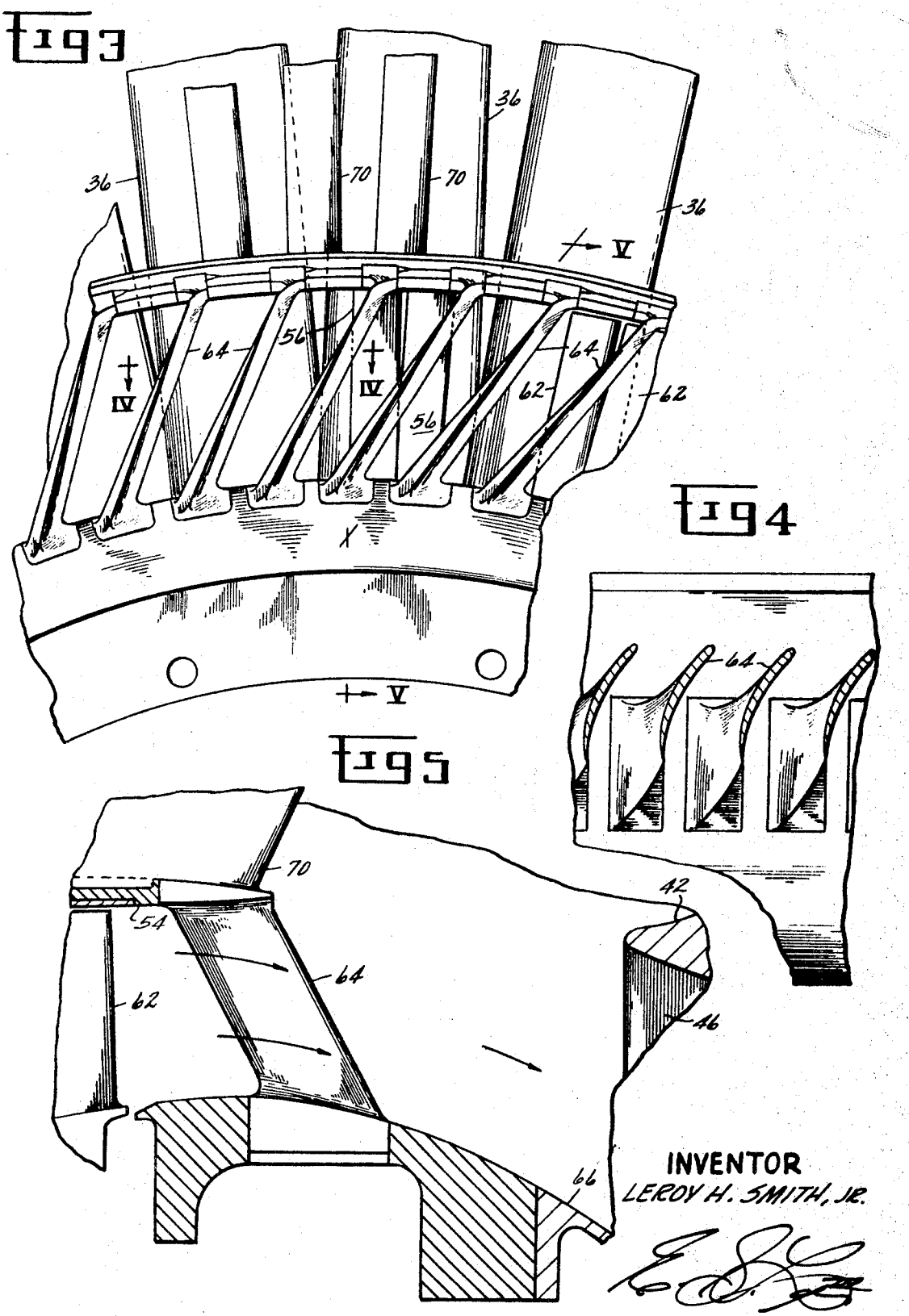
INVENTOR
LEROY H. SMITH, JR.
ATTORNEY

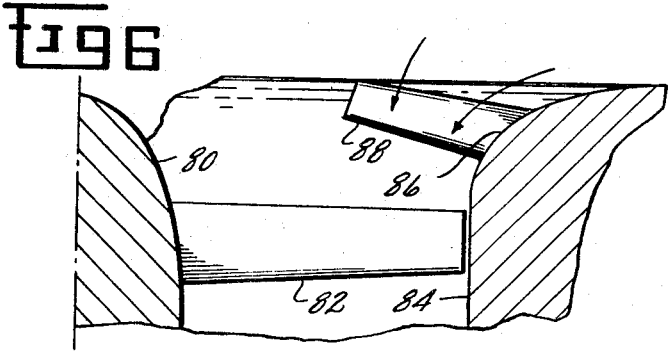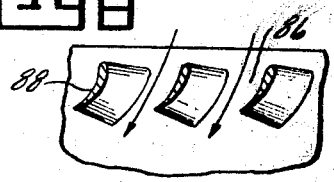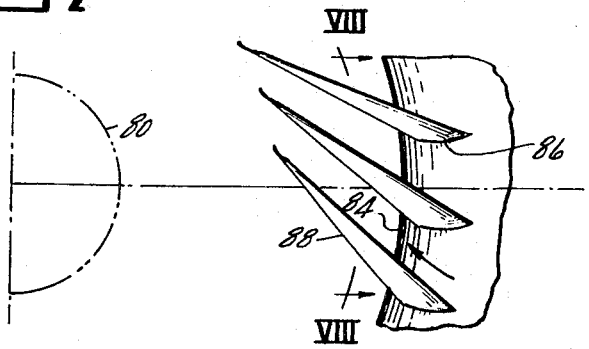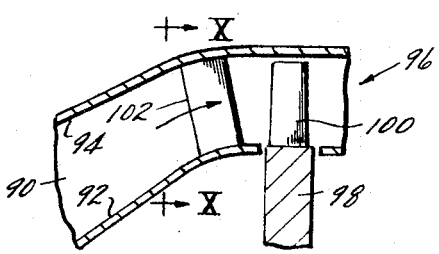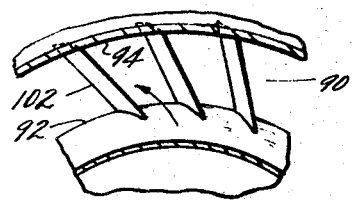
INVENTOR
LEROY H. SMITH, JR.
ATTORNEY United States Patent Office 3,536,414
Patented Oct. 27, 1970

3,536,414
VANES FOR TURNING FLUID FLOW IN AN ANNULAR DUCT
Leroy H. Smith, Jr., Cincinnati, Ohio, assignor to General Electric Company, a corporation of New York
Filed Mar. 6, 1968, Ser. No. 710,824
Int. Cl. F04d 19/00
U.S. Cl. 415—211                                    1 Claim

ABSTRACT OF THE DISCLOSURE

The disclosure shows a turbofan engine in which the inner portion of an air stream pressurized by a fan is turned about a relatively small radius by outlet guide vanes which are canted relative to radial positions, with their concave surfaces facing the convex surface of the duct. Another disclosure illustrates the same principle, utilizing cantilevered, canted inlet guide vanes to efficiently turn air around a convexly curved, annular surface forming the entrance to a fan. A further embodiment illustrates another use of canted guide vanes to change the swirl angle and efficiently turn the flow of fluid around a longitudinally curved, annular duct.

---

The present invention relates to improvements in fluid handling means and more particularly to improvements in efficiently controlling flow of air along a longitudinally curved, annular duct.

In turbomachines, such as compressors, fans, turbines, gas turbine engines, turbofan engines and the like, there are many occasions where it is desirable to turn the flow of air or other fluids around longitudinally curved portions of annular ducts, particularly at the inlets to or the discharge paths from the rotors of the turbomachines. If it is attempted to turn the flow of fluid around relatively short radii at high velocities, substantial energy losses can occur and are greatest at the convexly curved portion of the duct wall. In employing flow curvature radii sufficiently great to minimize or eliminate such loss, the overall duct length is necessarily increased. Increased duct length can be a disadvantage for many reasons and is a serious problem in gas turbine engines used for propulsion of aircraft because of the weight penalties which are usually involved.

Accordingly, the object of the invention is to minimize losses in turning the flow of fluid around convexly curved portions of longitudinally curved, annular flow paths. Particularly in turbomachinery, there is a need to change the swirl angle of fluid flowing through annular passages. Thus, for example, pressurized air, discharged from rotating fan blades of a turbofan engine, has a tangential component, or swirl, which must be removed so that a longitudinal thrust vector is provided when the pressurized air is discharged from the propulsive nozzle. This is a requisite to obtaining full propulsive effectiveness from the pressurized air stream. Another example is found at the inlet to certain fans, or turbines, where it is desired that the air entering the rotating blades have a given tangential component for proper compressor efficiency.

Another object of the invention is to control the swirl of air as it is being efficiently turned about a curved annular flow path.

Broadly speaking, the above objects are attained by providing, in an annular duct having a wall portion which is convexly curved in a longitudinal direction, a circumferential row of cascaded, cambered airfoil vanes. These vanes project from, or are mounted in close proximity to, the convexly curved wall portion with the wall portion curving substantially throughout the length of the vanes. The vanes are further canted from positions radial of the axis of the duct and are disposed with their concavely curved surfaces facing toward the convexly curved portion of the duct wall. This disposition of vanes has been found highly effective in changing the swirl angle as well as efficiently turning the flow of fluid around the convex curvature of the duct wall.

The above and other related objects and features of the invention will be apparent from a reading of the following description of the disclosure found in the accompanying drawings and the novelty thereof pointed out in the appended claim.

In the drawings:

FIG. 1 is a simplified showing of a turbofan engine;

FIG. 2 is an enlarged, longitudinal section of the forward portion of the engine seen in FIG. 1;

FIG. 3 is a section taken on line III—III in FIG. 2;

FIG. 4 is a section taken on line IV—IV in FIG. 3;

FIG. 5 is a section taken on line V—V in FIG. 3;

FIG. 6 is a simplified showing of a lift fan engine inlet;

FIG. 7 is a fragmentary plan view of the lift fan inlet seen in FIG. 6;

FIG. 8 is a projection taken on line VIII—VIII in FIG. 7;

FIG. 9 is a longitudinal view of a turbine inlet duct embodying the present invention; and FIG. 10 is a section taken on line X—X in FIG. 9.

The present invention, in certain aspects, relates to a compressor or fan construction which is illustrated in FIGS. 1–5. A separate application, Ser. No. 710,823, has been filed simultaneously with the present application in the names of the present inventor and James N. Krebs, claiming such novel features that do not form a part of the present invention. Both the present application and the related application are of common assignment.

The turbofan engine seen in FIG. 1 comprises a core engine 12 which generates a hot gas stream and a fan or low pressure compressor 14. The fan 14 is driven by the core engine and pressurizes an air stream which is discharged from a nozzle 15 to provide a propulsive force.

The core engine comprises a high pressure compressor 16 which pressurizes an annular stream of air to support combustion of fuel in a combustor 17. The hot gas stream, thus generated, is discharged through a high pressure turbine 18 to drive a turbine rotor 20. This rotor is connected to and drives the rotor 24 of the high pressure compressor 16. The hot gas stream then passes through a low pressure turbine 26 and is discharged through a primary nozzle 28 to provide a further propulsive force.

The fan turbine 26 includes a rotor 30, which is connected by an inner shaft 32 to a fan rotor 34 at the inlet end of the engine. The fan rotor 34 has a row of blades 36 secured to its hub and projecting to a cowl 38. The outer portion of the air stream pressurized by the fan blades is discharged through the nozzle 15 which is defined by the downstream end of the cowl 38 and a nacelle 42 within which the core engine is housed. The inner portion of the air pressurized by the fan blades 36 is further pressurized by a fractional fan stage 44 and then directed to an inlet duct 46, leading to the core engine 12 and specifically to the high pressure compressor 16.

Reference is next made to FIG. 2 for a more detailed description of the fan 14. The fan rotor 34 comprises a disc 47 which is secured to the compositely formed tubular shaft 32. Appropriate bearings, as at 48 and 50, are provided for journaling this shaft. A bullet nose 52 is secured to the forward end of the disc 47. The fractional fan stage 44 comprises a splitter ring 54 having its leading edge disposed adjacent the downstream ends of the blades 36. Stator vanes 56 extend inwardly from the ring 54 to an inner shroud 58. A disc 60 is secured to the disc 47. A circumferential row of relatively short blades 62 is mounted on the disc 60. These blades terminate adjacent the ring 54. Outlet guide vanes 64 extend from the downstream end of the ring 54 to a compositely formed casing 66 which defines, in part, the inner bounds of the fan stream flow path and the inner bounds of the engine inlet 46. The remainder of the inner bounds of the annular, fan flow path is defined by platforms at the bases of the blades 36 and 62 and the vanes 56, all of the flow path defining means, being generally aligned with the hub of the fan rotor. The outer surface of this inlet duct 46 is defined by the inner surface of the nacelle 42.

Outlet guide vanes 70 extend from the ring 54 to the cowl 38 and provide further structural interconnections between the stationary portions of the fractional stage 44 and the cowl. Struts 72 extend between the cowl 38 and the nacelle 42 to provide structural connections therebetween.

The leading edge of the nacelle 42 functions as a secondary splitter, allowing varying proportions of the total fan discharge to be directed toward the nozzle 15 and into the core engine inlet 46. In any event at least a portion of the pressurized air discharged by the fractional fan stage 44 is directed into the core engine inlet 46.

For reasons relevant to the overall turbofan engine cycle, the radius at the hub of the blade 62 is much greater than the hub radius of the high pressure compressor rotor 24 at its inlet. This leads to the requirement of the inwardly angled inlet duct, which is seen in FIG. 2.

The problem encountered and solved by the present invention is in turning the fractional stage, fan discharge about a relatively small radius of curvature in order that the overall duct and engine length may be maintained at a minimum.

Ordinarily there is a tendency for fluid flow to separate when it is turned about a relatively short radius of curvature. The problem, of course, is always more significant at the convexly curved portion of a duct wall than at the opposite wall.

In the accordance with the present invention, the outlet guide vanes 64 are canted from radial positions, i.e., at an angle to both radial and axial planes relative to the duct, as illustrated in FIG. 3. By having the concave surfaces of these cambered vanes facing the convexly curved surface of the wall 66, from which they project, a velocity component is imparted to the air which carries it around the curved surface with a minimum of energy loss. Further, and as will be apparent from FIGS. 4 and 5, the swirl angle of the air is changed. Specifically in the present case, the air discharged from the fan blades 62 has a tangential component best illustrated in FIG. 4. As the air flows through the vanes 64, the vector component is changed to substantially a longitudinal direction.

FIGS. 6–8 illustrate the present invention embodied in inlet guide vanes for a lift fan engine. One effective mode of obtaining vertical takeoff of an aircraft is in the provision of lift fans in the wings of the aircraft. The lift fans provide an upward thrust force enabling the aircraft to reach a safe operating height with little or no forward flight. Thereafter transmission can be made to forward flight under the power of more or less conventional propulsion systems. In forward flight the inlet and outlet to the lift fan are covered by flaps which fit flush with the airfoil surface of the wing. Such lift fan applications require a minimum of axial length, i.e., vertical thickness to be incorporated in the wings of an aircraft without introducing drag effects. Lift fans also require a relatively large inlet area and generally have a low hub to tip diameter ratio. Further, since the upward rate of climb is relatively slow, there is very little ram effect. To obtain the required mass air flow through the fan, air is drawn therein from a substantial area marginally of the fan diameter.

FIG. 6 illustrates a fan rotor 80 having a plurality of blades 82 projecting therefrom to the outer wall 84 of the fan duct. The entrance end of the fan duct, and the inlet to the fan itself, is defined by a convexly curved wall surface 86 so that air may readily flow from the peripheral margin of the fan. It will be apparent that the air flowing around the surface 86 must be turned about a relatively short radius, whereas the air toward the center of the fan inlet annulus turns about a greater radius and, at the inner portion of the fan annulus, comes in an esentially axial direction.

To assist in turning the flow of air about the curved surface 86, a plurality of canted, cantilevered, inlet guide vanes 88 are provided. These vanes function in a similar fashion to the outlet guide vanes 64 previously described in that they minimize the losses of the air as it is turned about the relatively small radius of curvature. These vanes are cambered and tilted at the proper angle to impart a desired preswirl to the inlet air as it is directed to the compressor or fan blades 82. Since the inner portion of the fan stream enters in essentially an axial direction and at a lower velocity, the cantilevered vanes 88 are preferred. Further, the amount of preswirl to the air is greatest at the outer portions of the air stream, and for this reason the blades are progressively changed in their camber from a maximum camber at the surface 86 to a minimum camber at their inner free ends.

FIGS. 9 and 10 illustrate a typical, longitudinally curved, annular duct 90 defined by an inner wall 92 and an outer wall 94. The duct 90 conveys a hot gas stream to a turbine 96 comprising a rotor 98 having blades 100 projecting therefrom into the duct. Turbine nozzle vanes 102 extend between the duct walls 92, 94. Here, again, the flow path is to be turned about a relatively short radius and the vanes 102 project from the convexly curved portion of the duct to the concavely curved portion of the duct wall 94. These vanes are similarly canted, as will be evident from FIG. 10, to again minimize turning losses as the hot gas stream flows through the duct 90 to the turbine 96.

Although several embodiments have been depicted and described, it will be understood that the present invention is not limited thereto and that various modifications and changes may be made thereto without departing from the fundamental theme of the invention.

Having thus described the invention, what is claimed as novel and desired to be secured by Letters Patent of the United States is:

1. In a turbomachine, an annular duct having an inner wall portion which is convexly curved in a longitudinal direction, a bladed turbomachinery rotor adapted to pressurize at least a portion of the fluid flow through said duct and discharge said fluid at a predetermined swirl angle, a circumferential row of cascaded, cambered airfoil vanes for receiving said pressurized fluid, said airfoil vanes extending from said convexly curved wall portion, said duct wall being curved substantially from the leading to the trailing edge of said vanes, said vanes being canted at an angle to both radial and axial planes relative to said duct with their concavely curved surfaces facing toward the convexly curved portion of said duct wall and cambered so that the pressurized fluid will be efficiently turned around the convexly curved portion of said duct wall and will be deswirled and directed generally in a longitudinal direction.

References Cited

UNITED STATES PATENTS

| | | | |
|---|---|---|---|
| 2,869,821 | 1/1959 | Halford | 253—78 |
| 2,960,306 | 11/1960 | Collman | 230—122 |
| 2,962,260 | 11/1960 | Foley | 253—78 |
| 3,300,180 | 1/1967 | Tuttle | 253—78 |

FOREIGN PATENTS

| | | |
|---|---|---|
| 807,572 | 7/1951 | Germany. |
| 823,441 | 10/1937 | France. |

DOUGLAS HART, Primary Examiner

U.S. Cl. X.R.

415—77